US010046792B2

(12) United States Patent
Sóti et al.

(10) Patent No.: US 10,046,792 B2
(45) Date of Patent: Aug. 14, 2018

(54) LIMP ASIDE STEERING ASSIST WITH ESTIMATED MOTOR CURRENT

(71) Applicants: ThyssenKrupp Presta AG, Eschen (LI); ThyssenKrupp AG, Essen (DE)

(72) Inventors: Ádám Sóti, Budapest (HU); Ferenc Illés, Budapest (HU)

(73) Assignee: thyssenkrupp AG, Essen (DE)

( * ) Notice: Subject to any disclaimer, the term of this patent is extended or adjusted under 35 U.S.C. 154(b) by 0 days.

(21) Appl. No.: 15/269,359

(22) Filed: Sep. 19, 2016

(65) Prior Publication Data
US 2017/0080971 A1 Mar. 23, 2017

Related U.S. Application Data

(63) Continuation of application No. PCT/EP2015/071477, filed on Sep. 18, 2015.

(51) Int. Cl.
B62D 5/04 (2006.01)
B62D 6/00 (2006.01)
(Continued)

(52) U.S. Cl.
CPC ........... *B62D 5/0484* (2013.01); *B62D 5/049* (2013.01); *B62D 5/0463* (2013.01); *B62D 5/0487* (2013.01); *B62D 6/008* (2013.01); *B62D 6/10* (2013.01); *H02P 21/14* (2013.01); *H02P 21/22* (2016.02); *H02P 29/64* (2016.02); *B62D 5/0481* (2013.01)

(58) Field of Classification Search
CPC ..... B62D 5/0484; B62D 5/0463; H02P 21/22; H02P 29/64
See application file for complete search history.

(56) References Cited

U.S. PATENT DOCUMENTS

2008/0309270 A1 12/2008 Suzuki
2008/0315809 A1 12/2008 Tamaizumi
2009/0224707 A1* 9/2009 Williams ............. B62D 5/0481
318/400.02

FOREIGN PATENT DOCUMENTS

EP 1737116 A1 12/2006

OTHER PUBLICATIONS

International Search Report and Written Opinion for International Application No. PCT/EP2015/071477 dated Jun. 10, 2016, 12 pages.

* cited by examiner

*Primary Examiner* — Michael D Lang
(74) *Attorney, Agent, or Firm* — RMCK Law Group PLC

(57) ABSTRACT

The present invention relates to an electromechanical motor vehicle power steering mechanism for assisting steering of a motor vehicle by conferring torque generated by an electric motor to a steering mechanism. A steering controller receives at least signals representative of the vehicle velocity and the torque applied to a steering wheel and a rotor position signal to determine a target motor torque, a motor controller which receives the target motor torque from the steering controller and transfers it into target voltages expressed in a coordinate system fixed to the stator and a motor driver which transforms the target voltages into motor currents, at least one current measurement unit which measures the motor currents, wherein the mechanism further comprises a current estimation unit which estimates the target currents and a diagnostic unit which compares the estimated target currents to the measured motor currents in order to identify and remedy occurring faults.

20 Claims, 3 Drawing Sheets

(51) Int. Cl.
*B62D 6/10* (2006.01)
*H02P 21/22* (2016.01)
*H02P 21/14* (2016.01)
*H02P 29/64* (2016.01)

LIMP ASIDE STEERING ASSIST WITH ESTIMATED MOTOR CURRENT

CROSS-REFERENCE TO RELATED APPLICATION

This application is a continuation of International Patent Application No. PCT/EP2015071477 filed on Sep. 18, 2015. The disclosure of the above application is incorporated herein by reference.

FIELD

The present invention relates to an electromechanical motor vehicle power steering mechanism.

BACKGROUND

In an electric power steering apparatus the steering assist force is applied to a steering mechanism by driving an electric motor in accordance with steering torque that is applied to a steering wheel by a driver. An electronic control unit with an inverter controls the motor. The inverter feds the motor with sinusoidal motor parameters (current, voltage, magnetic flux) for torque generation. Usually, the feeding of the electric motor is monitored for faults by current feedback measurements. These current measurements can fail abruptly. Conventionally, abnormalities in the current measurement are detected by comparing the signals of two current measurement channels and, if the difference is greater than a specified limit, a shutdown is triggered. In this case, the system cannot decide which current is usable for control. The steering assist force is no longer present which is uncomfortable for the driver.

EP 1 737 116 A1 discloses a control apparatus for an electric motor in which, even in case of abnormality, where current does not flow through one phase of the electric motor or an inverter on account of disconnection or the like, a current suitable for the abnormality is caused to flow through the electric motor, and the output of the motor torque can be continued. However disadvantageously, this method does not work in case of failure of current measurement of all phases; the system shuts down, causing loss of steering assist.

SUMMARY

It is object of the present invention to provide an electromechanical motor vehicle power steering mechanism with a control mechanism which provides current to the electric motor even in the event of failure of the current measurement.

This object is achieved by an electromechanical motor vehicle power steering mechanism having the features of claim 1. Advantageous embodiments of the invention are disclosed in claims 2 to 9.

Accordingly, an electromechanical motor vehicle power steering mechanism for assisting steering of a motor vehicle by conferring torque generated by an electric motor to a steering mechanism is provided, the mechanism comprising:
a steering controller which receives signals representative of at least the vehicle velocity v and the torque $T_{TS}$ applied to a steering wheel and a rotor position signal to derive a target motor torque $T_d$,
a motor controller which receives the target motor torque $T_d$ from the steering controller and transfers it into target voltages $U_{\alpha,d}$, $U_{\beta,d}$ expressed in a coordinate system fixed to the stator and
a motor driver which transforms the target voltages $U_{\alpha,d}$, $U_{\beta,d}$ into motor currents $I_U, I_V, I_W$,
at least one current measurement unit which measures the motor currents $I_U, I_V, I_W$, The mechanism further comprises a current estimation unit which estimates the target currents $I_{dest}, I_{qest}=I1,_{est}$ and a diagnostic unit which compares the target currents $I_{dest}, I_{qest}=I1,_{est}$ to measured current $I_{q1}, I_{d1}=I1$ and/or to measured current $I_{q2}, I_{d2}=I2$, which are transformed from the measured motor currents $I_{U1}$, $I_{V1}$, $I_{W2}$, $I_{U2}$, $I_{V2}$, $I_{W2}$ into the two-dimensional d-q coordinate system in order to identify and correct occurring faults. The estimated current signals help to decide if the at least one current measurement is erroneous. If the at least one current measurement fails to operate due to common cause error, the other current measurement unit can provide assist steering. If both measurement units fail to operate due to common cause error, the estimated signal is used for control to provide limp aside. The diagnostic unit can behave as current feedback control, feeding an actual current back into the main loop of the motor control circuit.

According to the invention the motor currents $I_{U1}$, $I_{V1}$, $I_{W1}$, $I_{U2}$, $I_{V2}$, $I_{W2}$ are measured in the U-V-W coordinate system and transformed into the d-q coordinate system, in which those are expressed as measured motor currents $I_{q1}, I_{d1}=I1$, $I_{q2}, I_{d2}=I2$. Those transformed measured motor currents $I_{q1}, I_{d1}=I1$, $I_{q2}, I_{d2}=I2$ are compared to the estimated target currents $I_{dest}, I_{qest}=I1,_{est}$ which are provided in the rotating d-q coordinate system by the current estimation unit.

In a preferred embodiment the mechanism comprises a coordinate transformation unit, transforming the measured motor currents $I_{U1}$, $I_{V1}$, $I_{W1}$, $I_{U2}$, $I_{V2}$, $I_{W2}$ into measured currents $I_{q1}, I_{d1}=I1$, $I_{q2}, I_{d2}=I2$ expressed in the two-dimensional d-q coordinate system. Said coordinate transformation unit converts, that means transforms the motor current values $I_{U1}, I_{V1}, I_{W1}, I_{U2}, I_{V2}, I_{W2}$ as measured in the U-V-W coordinate system into motor current value expressions $I_{q1}, I_{d1}=I1, I_{q2}, I_{d2}=I2$ expressed in the d-q coordinate system. The comparison between estimated target currents $I_{dest}, I_{qest}=I1,_{est}$ and measured motor currents $I_{q1}, I_{d1}=I1$, $I_{q2}, I_{d2}=I2$, is realized by the diagnostic unit in the d-q coordinate system. By using the d-q coordinate system it is possible to compare at any time the estimated currents $I_{dest}, I_{qest}=I1,_{est}$ with the redundant measured motor current $I_{q1}, I_{d1}=I1$ and—if desired—with the measured motor current $I_{q2}, I_{d2}=I2$. The use of two redundant measured motor currents I1, I2 increases the fail safe state and allows to improve the diagnostics safety.

Advantageously, the motor driver comprises an inverter which transforms the voltages $U_{\alpha,d}, U_{\beta,d}$ into the three-phase voltages $U_U$, $U_V$, $U_W=U2$. In a preferred embodiment the current estimation unit comprises a motor model unit, which is fed by estimated voltages $U_{Uest}, U_{Vest}, U_{West}$ based on the voltages $U_U$, $U_V$, $U_W$ outputted by the inverter and which preferably comprises a coordinate transformation which transforms the estimated motor currents into a two-dimensional rotating reference frame (d-q) fixed to the rotor of the motor $I_{dest}, I_{quest}$. In a preferred embodiment the motor model uses at least the rotational angular velocity $\omega$ and the voltages $U_{Uest}, U_{Vest}, U_{West}$ as input parameters without the estimated winding temperature $T_{Coil}$.

In a more preferred embodiment the current estimation unit has at least the rotational angular velocity $\omega$ of the rotor and the estimated voltages $U_{Uest}, U_{Vest}, U_{West}$ and the estimated winding temperature $T_{Coil}$ as input parameters. The estimated winding temperature $T_{Coil}$ can be estimated on the basis of the voltages and/or measured currents which are inputted into the motor in the recent past. The recent past is a time period which is preferably between 0.1 and 60 seconds before the coordinate transformation starts. It is further preferable, if the time period for estimating the winding temperature is between 60 seconds and 5 minutes in the past.

Advantageously, the mechanism comprises two redundant current measurement units. This way the estimated signal is used to decide if and which one of the current measurement units is wrong. The usable signal is used for control. Steering assist can be maintained.

In a preferred embodiment the motor driver comprises one single shunt using two independent operational amplifiers to reconstruct the motor currents. It is preferred, that the motor driver comprises two shunts each on one line to reconstruct the motor currents $I_U, I_V, I_W$.

The object of the present invention is additionally achieved by a method for current feedback control having the above features.

Accordingly, a method for current feedback control in an electromechanical motor vehicle power steering mechanism is provided, said method comprising the steps of:
receiving at least signals representative of the vehicle velocity v and the torque $T_{TS}$ applied to a steering wheel 3 and a rotor position signal
determining on the basis of the received signals a target motor torque $T_d$,
transferring the target motor torque $T_d$ into target voltages $U_{\alpha,d}, U_{\beta,d}$ expressed in a coordinate system fixed to the stator and
transforming the target voltages $U_{\alpha,d}, U_{\beta,d}$ into motor currents $I_U, I_V, I_W$,
measuring the motor currents in at least one current measurement unit,
estimation of the target currents $I_{dest}, I_{qest}$=I1 test in a current estimation unit,
comparing the estimated target currents $I_{dest}, I_{qest}$=I1,$_{est}$ to the measured motor currents $I_{U1}, I_{V1}, I_{W1}, I_{U2}, I_{V2}, I_{W2}$ in a diagnostic unit,
feeding back an actual motor current $I_{q,fb}; I_{d,fb}$=I2 into the main loop.

Preferably, the rotational angular velocity ω of the rotor, the estimate voltages $U_{Uest}, U_{Vest}, U_{West}$ based on the target voltages $U_{\alpha,d}, U_{\beta,d}$ and the estimated winding temperature $T_{Coil}$ are input parameters for the motor model unit. In an advantageous embodiment the mechanism comprises two redundant current measurement units.

BRIEF DESCRIPTION OF THE DRAWINGS

An exemplary embodiment of the present invention is described below with aid of the drawings. In all figures the same reference signs denote the same components or functionally similar components.

DETAILED DESCRIPTION

Figure 1:
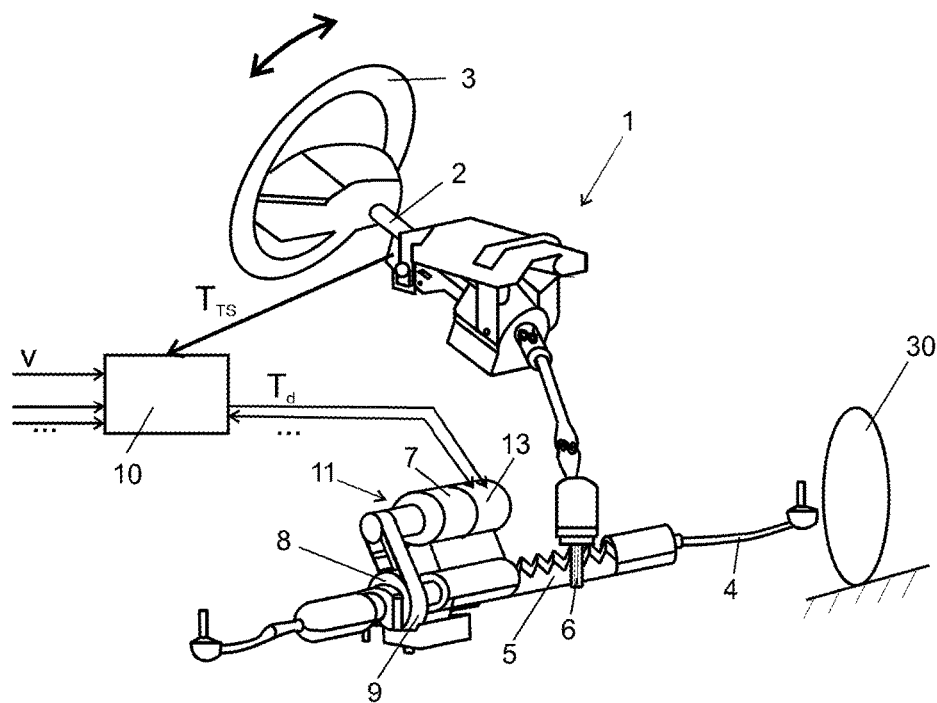
FIG. 1 shows an electromechanical power steering mechanism in a schematic illustration.

In FIG. 1 an electromechanical power steering mechanism 1 is schematically illustrated with a steering shaft 2 connected to a steering wheel 3 for operation by the driver. The steering shaft 2 is coupled to a steering rack 5 via a gear pinion 6. Steering rack rods 4 are connected to the steering rack 5 and to steered wheels 30 of the motor vehicle. A rotation of the steering shaft 2 causes an axial displacement of the steering rack 5 by means of the gear pinion 6 which is connected to the steering shaft 2 in a torque-proof manner. To provide steering assistance, an electric motor 7 mounted to the side of the rack housing drives a ball-screw mechanism 8 via a toothed rubber belt 9. Electric power assist is provided through a steering controller 10 and a power assist actuator 11 comprising the electric motor 7 and a motor controller 13. The steering controller 10 in the example receives signals representative of the vehicle velocity v and the torque $T_{TS}$ applied to the steering wheel by the vehicle operator. In addition, as the rotor of the electric motor 7 turns, rotor position signals are generated within the electric motor 7 and provided to the steering controller 10. In response to the vehicle velocity v, the operator torque $T_{TS}$ and the rotor position signal, the controller 10 determines the target motor torque $T_d$ and provides the signal through to the motor controller 12, where the motor currents are calculated via PWM (pulse-width modulation). The electric motor 7 is a permanent magnet-excited motor.

Figure 2:
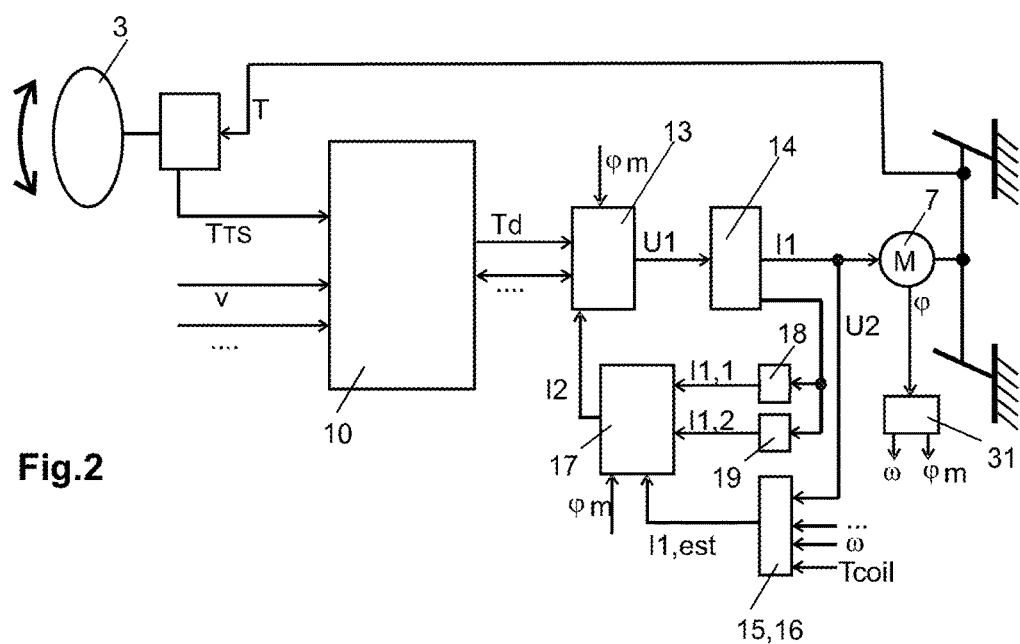
FIG. 2 is a block diagram showing an electrical structure of the electric power steering apparatus.

FIG. 2 shows a block diagram of the electrical structure of the electric power steering apparatus. The steering controller 10 receives signals representative of the vehicle velocity v and the torque $T_{TS}$ applied to the steering wheel by the vehicle operator and determines the target motor torque $T_d$. This torque $T_d$ is fed to the motor controller 13 which determines the voltage input for the PWM and a motor driver 14 generates via the PWM the motor currents $I_U, I_V, I_W$=I1. Hence, the motor 7 generates a torque T which compensates the operator torque $T_{TS}$. Estimated currents I1,$_{est}$ are calculated in a current estimation unit 15 via the voltages U2 determined by the motor controller 13 and a motor model unit 16. A diagnostic unit 17 receives the estimated currents I1,$_{est}$, the measured motor angle $\varphi_m$ from the Rotor Position Sensor 31 (RPS-sensor) and redundantly measured motor currents I1,1, I1,2 each measured by a current measurement unit 18, 19 and compares the estimated motor currents I test with the measured motor currents I1,1, I1,2. If a fault in one of the current measurement units is detected, the error-free current measurement unit can feed the steering assistance. For this purpose a current I2 is fed back into the main loop of the motor controller 13 as current feedback control.

Figure 3:
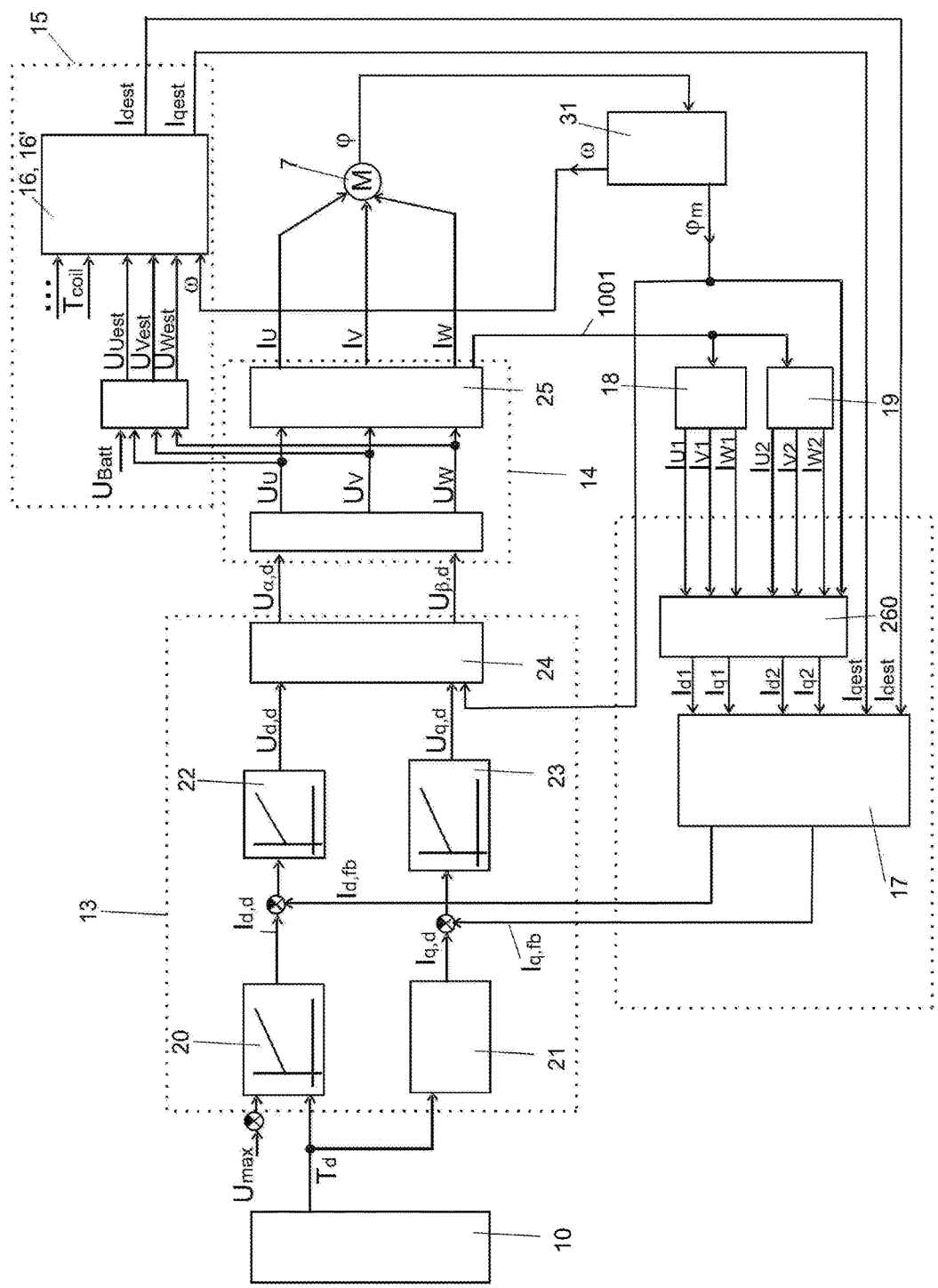
FIG. 3 is another block diagram showing the circuit of FIG. 2 in detail.

The electrical structure of the electric power steering apparatus 1 is shown in detail in FIG. 3. Based on the target motor torque $T_d$ the target-currents $I_{d,d}$ and $I_{q,d}$ are determined through a PI controller 20 and a unit 21. The target currents $I_{d,d}$ and $I_{q,d}$ are responsible for the determination of motor voltage conditions and motor torque. They are expressed in the rotating reference frame (d-q) fixed to the rotor of the motor 7. The target currents $I_{d,d}$ and $I_{q,d}$ are then transferred via current controllers 22, 23 into target voltages $U_{q,d}, U_{d,d}$. After that a coordinate transformation 24 converts the rotating two-dimensional d-q coordinate system into a coordinate system $U_{\alpha,d}, U_{\beta,d}$ fixed to the stator. In the next step the inverter 25 transforms the voltages into the threedimensional coordinate system of the motor 7 and sensors transform the voltages into motor currents $I_U, I_V, I_W$. For current feedback control the motor currents $I_U, I_V, I_W$ are measured redundantly in two current measurement units 18, 19. In a coordinate transformation 260 the measured currents $I_{U1}, I_{V1}, I_{W1}, I_{U2}, I_{V2}, I_{W2}$ are transformed, that means converted in the rotational two-dimensional d-q coordinate system and fed into the diagnostic unit 17.

The output voltages $U_U, U_V, U_W$ of the inverter 25 are transmitted to the current estimation unit 15 and transformed into estimated voltages $U_{Uest}, U_{Vest}, U_{West}$ and then fed to the motor model unit 16. The motor model unit 16 determines from the rotational angular velocity ω of the rotor, the estimated voltages $U_{Uest}, U_{Vest}, U_{West}$, the estimated winding temperature $T_{Coil}$ and possibly also the motor angle φ an estimated current $I1,_{est}$. In addition a coordinate transformation 16' is carried out in the motor model unit 16 to output an estimated current $I_{dest}, I_{qest} = I1,_{est}$, wherein the estimated current is expressed in the rotating reference frame (d-q) fixed to the rotor of the motor 7. The estimated current $I_{dest}, I_{qest} = I1,_{est}$ is transmitted to the diagnostic unit 17. The diagnostic unit 17 compares the estimated current $I1,_{est}$ with the measured currents $I_{d1}, I_{q1}, I_{d2}, I_{q2}$. The RPS-sensor 31 measures the motor angel $φ_m$ and transmits this information to the motor controller 13 and the coordinate transformation unit 260 in the feedback loop in order to determine the actual current $I_{q,fb}; I_{d,fb} = I2$.

The estimated current $I1,_{est}$ represents a target current from which the diagnostic unit 17 can determine, if an error occurred during current calculation between the motor controller 13 and the inverter 25. The diagnostic unit 17 compares the estimate currents $I1,_{est}$, received from the motor model unit 16, and the two measured currents $I_{d1,q1}$ and $I_{d2,q2}$ from the current measurement units 18, 19. If a fault is detected in one of the current measurement units 18, 19, the steering assistance can be carried out with the signal from the error-free current measurement unit 18, 19. For this purpose a current I2 is fed back into the main loop of the motor control circuit behind the PI controller 20 and the unit 21 as current feedback control. In case that both current measurement units 18, 19 fail, steering assistance can be maintained for a certain time by feeding back an actual current I2 based on the estimate current $I1,_{est}$.

Figure 4:
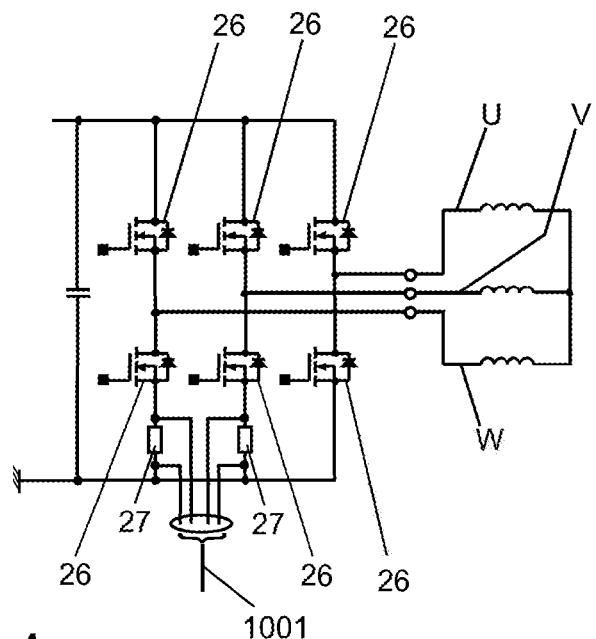
FIG. 4 shows solely the schematic illustration of an inverter.
Figure 5:
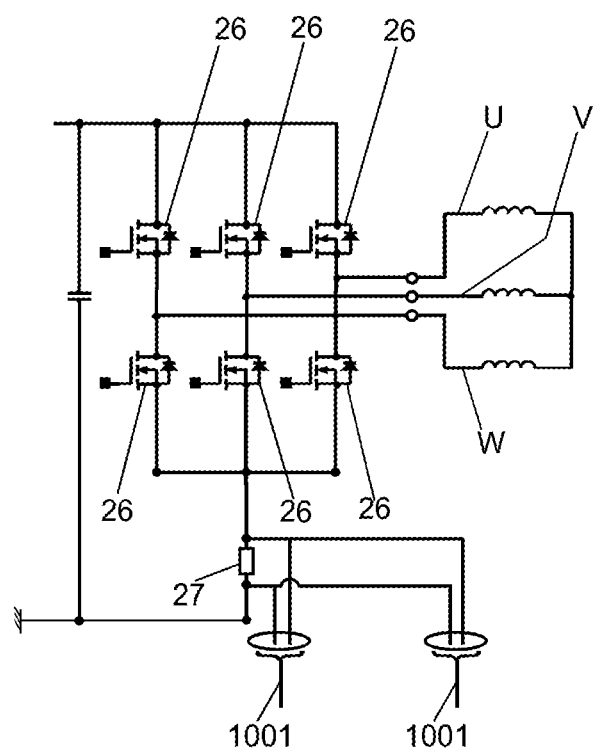
FIG. 5 shows another schematic illustration of the inverter.

As shown in FIG. 4, the servomotor is actuated by the control unit via a set of MOSFETs 26, wherein with three phase windings six MOSFETs 26 are provided in total. Each MOSFET 26 switches the assigned phase winding U, V, W to the on-board vehicle power-supply voltage or the earth potential. This occurs at a high frequency so that the temporal average value acts as the effective voltage in the phase windings U, V, W. Two shunts 27 are implemented on one thread each to calculate the motor currents. The output signal 1001 is transmitted into the current measurement units 18, 19. It is also possible, as shown in FIG. 5, to implement one single shunt 27 on one thread to calculate the motor currents.

The present invention provides an electromechanical motor vehicle power steering mechanism with a control apparatus, which feeds current to the electric motor even in the event of failure of the current measurement units. An estimated signal is used to decide which current measurement channel is wrong, while with the remaining signal assist can be maintained. If both signals fail, then the estimated value is used for limp aside steering assist, making it possible to steer the car to a safe place. The present invention increases the robustness of the steering system.

The invention claimed is:

1. An electromechanical motor vehicle power steering mechanism for assisting steering of a motor vehicle by conferring torque generated by an electric motor to a steering mechanism, the mechanism comprising:
   a steering controller which receives signals representative of at least the vehicle velocity (v) and the torque ($T_{TS}$) applied to a steering wheel and a rotor position signal to determine a target motor torque ($T_d$),
   a motor controller which receives the target motor torque ($T_d$) from the steering controller and transfers it into target voltages ($U_{α,d}, U_{β,d}$) expressed in a coordinate system fixed to the stator;
   a motor driver which transforms the target voltages ($U_{α,d}, U_{β,d}$) into motor currents ($I_U, I_V, I_W$);
   at least one current measurement unit which measures the motor currents ($I_U, I_V, I_W$);
   a current estimation unit which estimates the target currents ($I_{dest}, I_{qest} = I1,_{est}$) and a diagnostic unit which compares the estimated target currents ($I_{dest}, I_{qest} = I1,_{est}$) to measured currents ($I_{q1}, I_{d1} = I1, I_{q2}, I_{d2} = I2$), which are transformed from the measured motor currents ($I_{U1}, I_{V1}, I_{W1}, I_{U2}, I_{V2}, I_{W2}$) into the two-dimensional d-q coordinate system in order to identify and remedy occurring faults; and
   a coordinate transformation unit, transforming the measured motor currents ($I_{U1}, I_{V1}, I_{W1}, I_{U2}, I_{V2}, I_{W2}$) into measured currents ($I_{q1}, I_{d1} = I1, I_{q2}, I_{d2} = I2$) expressed in the two-dimensional d-q coordinate system.

2. The electromechanical motor vehicle power steering mechanism according to claim 1 wherein the motor driver comprises an inverter which transforms the voltages ($U_{α,d}, U_{β,d}$) into three-phase voltages ($U_U, U_V, U_W = U2$).

3. The electromechanical motor vehicle power steering mechanism according to claim 1 wherein the current estimation unit comprises a motor model unit, which is fed by estimated voltages ($U_{Uest}, U_{Vest}, U_{West}$) based on the voltages ($U_U, U_V, U_W$) outputted by the inverter.

4. The electromechanical motor vehicle power steering mechanism according to claim 3 wherein the mechanism comprises two redundant current measurement units.

5. The electromechanical motor vehicle power steering mechanism according to claim 3 wherein the motor model unit comprises a coordinate transformation which transforms the estimated motor currents into a two-dimensional rotating reference frame ($I_{dest}, I_{qest} = I1$) fixed to the rotor of the motor.

6. The electromechanical motor vehicle power steering mechanism according to claim 4 wherein the rotational angular velocity (ω) of the rotor and the estimated target voltages ($U_{Uest}, U_{Vest}, U_{West}$) and the estimated winding temperature ($T_{Coil}$) are at least input parameters for the motor model unit.

7. The electromechanical motor vehicle power steering mechanism of claim 6 wherein the motor driver comprises two shunts to reconstruct the motor currents ($I_U, I_V, I_W$).

8. The electromechanical motor vehicle power steering mechanism according to claim 1 wherein the diagnostic unit behaves as current feedback control, feeding an actual current (I2) back into the main loop of the motor control circuit.

9. A method for current feedback control in an electromechanical motor vehicle power steering mechanism, said method comprising the steps of:
   receiving at least signals representative of the vehicle velocity (v) and the torque ($T_{TS}$) applied to a steering wheel and a rotor position signal determining on the basis of the received signals a target motor torque ($T_d$) transferring the target motor torque ($T_d$) into target voltages ($U_{\alpha,d}$, $U_{\beta,d}$) expressed in a coordinate system fixed to the stator;

transforming the target voltages ($U_{\alpha,d}$, $U_{\beta,d}$) into motor currents ($I_U, I_V, I_W$);

measuring the motor currents in at least one current measurement unit;

estimating the target currents ($I_{dest}, I_{qest}$=I1,$_{est}$) in a current estimation unit;

comparing the estimated target currents ($I_{dest}, I_{qest}$=I1,$_{est}$) to the measured motor currents ($I_{U1}$, $I_{V1}$, $I_{W1}$, $I_{U2}$, $I_{V2}$, $I_{W2}$) in a diagnostic unit; and feeding back an actual motor current ($I_{q,fb}; I_{d,fb}$=I2) into the main loop;

wherein the rotational angular velocity ($\omega$) of the rotor, the estimate voltages ($U_{Uest}$, $U_{Vest}$, $U_{West}$) based on the target voltages ($U_{\alpha,d}$, $U_{\beta,d}$) and the estimated winding temperature ($T_{Coil}$) are input parameters for the motor model unit.

10. The method for current feedback control according to claim 9 wherein the mechanism comprises two redundant current measurement units.

11. An electromechanical motor vehicle power steering mechanism for assisting steering of a motor vehicle by conferring torque generated by an electric motor to a steering mechanism, the mechanism comprising:

a steering controller which receives signals representative of at least the vehicle velocity (v) and the torque ($T_{TS}$) applied to a steering wheel and a rotor position signal to determine a target motor torque ($T_d$), a motor controller which receives the target motor torque ($T_d$) from the steering controller and transfers it into target voltages ($U_{\alpha,d}$, $U_{\beta,d}$) expressed in a coordinate system fixed to the stator;

a motor driver which transforms the target voltages ($U_{\alpha,d}$, $U_{\beta,d}$) into motor currents ($I_U, I_V, I_W$);

at least one current measurement unit which measures the motor currents ($I_U, I_V, I_W$); and a current estimation unit which estimates the target currents ($I_{dest}, I_{qest}$=I1,$_{est}$) and a diagnostic unit which compares the estimated target currents ($I_{dest}, I_{qest}$=I1,$_{est}$) to measured currents ($I_{q1}, I_{d1}$=I1, $I_{q2}, I_{d2}$=I2), which are transformed from the measured motor currents ($I_{U1}$, $I_{V1}$, $I_{W1}$, $I_{U2}$, $I_{V2}$, $I_{W2}$) into the two-dimensional d-q coordinate system in order to identify and remedy occurring faults; and a coordinate transformation unit, transforming the measured motor currents ($I_{U1}$, $I_{V1}$, $I_{W1}$, $I_{U2}$, $I_{V2}$, $I_{W2}$) into measured currents ($I_{q1}, I_{d1}$=I1, $I_{q2}, I_{d2}$=I2) expressed in the two-dimensional d-q coordinate system;

wherein the motor driver comprises an inverter which transforms the voltages ($U_{\alpha,d}$, $U_{\beta,d}$) into three-phase voltages ($U_U, U_V, U_W$=U2).

12. The electromechanical motor vehicle power steering mechanism according to claim 11 wherein the current estimation unit comprises a motor model unit, which is fed by estimated voltages ($U_{Uest}$, $U_{Vest}$, $U_{West}$) based on the voltages ($U_U, U_V, U_W$) outputted by the inverter.

13. The electromechanical motor vehicle power steering mechanism according to claim 12 wherein the mechanism comprises two redundant current measurement units.

14. The electromechanical motor vehicle power steering mechanism according to claim 12 wherein the motor model unit comprises a coordinate transformation which transforms the estimated motor currents into a two-dimensional rotating reference frame ($I_{dest}, I_{qest}$=I1) fixed to the rotor of the motor.

15. The electromechanical motor vehicle power steering mechanism according to claim 14 wherein the rotational angular velocity ($\omega$) of the rotor and the estimated target voltages ($U_{Uest}$, $U_{Vest}$, $U_{West}$) and the estimated winding temperature ($T_{Coil}$) are at least input parameters for the motor model unit.

16. The electromechanical motor vehicle power steering mechanism of claim 15 wherein the motor driver comprises two shunts to reconstruct the motor currents ($I_U, I_V, I_W$).

17. An electromechanical motor vehicle power steering mechanism for assisting steering of a motor vehicle by conferring torque generated by an electric motor to a steering mechanism, the mechanism comprising:

a steering controller which receives signals representative of at least the vehicle velocity (v) and the torque ($T_{TS}$) applied to a steering wheel and a rotor position signal to determine a target motor torque ($T_d$), a motor controller which receives the target motor torque ($T_d$) from the steering controller and transfers it into target voltages ($U_{\alpha,d}$, $U_{\beta,d}$) expressed in a coordinate system fixed to the stator;

a motor driver which transforms the target voltages ($U_{\alpha,d}$, $U_{\beta,d}$) into motor currents ($I_U, I_V, I_W$);

at least one current measurement unit which measures the motor currents ($I_U, I_V, I_W$); and a current estimation unit which estimates the target currents ($I_{dest}, I_{qest}$=I1,$_{est}$) and a diagnostic unit which compares the estimated target currents ($I_{dest}, I_{qest}$=I1,$_{est}$) to measured currents ($I_{q1}, I_{d1}$=I1, $I_{q2}, I_{d2}$=I2), which are transformed from the measured motor currents ($I_{U1}$, $I_{V1}$, $I_{W1}$, $I_{U2}$, $I_{V2}$, $I_{W2}$) into the two-dimensional d-q coordinate system in order to identify and remedy occurring faults;

wherein the diagnostic unit behaves as current feedback control, feeding an actual current (I2) back into the main loop of the motor control circuit.

18. The electromechanical motor vehicle power steering mechanism according to claim 17 further comprising: a coordinate transformation unit, transforming the measured motor currents ($I_{U1}$, $I_{V1}$, $I_{W1}$, $I_{U2}$, $I_{V2}$, $I_{W2}$) into measured currents ($I_{q1}, I_{d1}$=I1, $I_{q2}, I_{d2}$=I2) expressed in the two-dimensional d-q coordinate system.

19. The electromechanical motor vehicle power steering mechanism according to claim 18 wherein the motor driver comprises an inverter which transforms the voltages ($U_{\alpha,d}$, $U_{\beta,d}$) into three-phase voltages ($U_U, U_V, U_W$=U2).

20. The electromechanical motor vehicle power steering mechanism according to claim 19 wherein the current estimation unit comprises a motor model unit, which is fed by estimated voltages ($U_{Uest}$, $U_{Vest}$, $U_{West}$) based on the voltages ($U_U, U_V, U_W$) outputted by the inverter.

* * * * *